(Model.)

H. WEINHAGEN.
THERMOMETER.

No. 310,925. Patented Jan. 20, 1885.

WITNESSES:
Gustave Dieterich
John C. Tunbridge

INVENTOR
Henry Weinhagen
BY
Briesen & Steele
his ATTORNEYS

UNITED STATES PATENT OFFICE.

HENRY WEINHAGEN, OF HOBOKEN, NEW JERSEY.

THERMOMETER.

SPECIFICATION forming part of Letters Patent No. 310,925, dated January 20, 1885.

Application filed October 1, 1884. (Model.)

*To all whom it may concern:*

Be it known that I, HENRY WEINHAGEN, a resident of Hoboken, in the county of Hudson and State of New Jersey, have invented a new and useful Improvement in Thermometers, of which the following is a full, clear, and exact description, reference being made to the accompanying drawings, in which—

Figure 1:
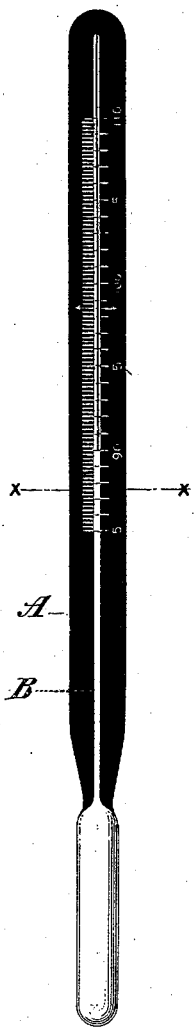
Figure 2:

Figure 1 is a face view of my improved thermometer, and Fig. 2 a cross-section on an enlarged scale of the same.

This invention has for its object to improve clinical and other thermometers in such manner that the position of the mercury-column therein can be readily perceived in a dark room. Sick-rooms are for the most part kept dark, and the thermometers at present in use, which have a white reflector incorporated with the glass and placed behind the mercury-column, render the observation of the latter difficult except in the presence of light.

My invention consists in placing behind the mercury-column, and embodying with the glass of the thermometer, a light-absorbing substance, which, instead of reflecting the light at the sides of the mercury-column, will absorb it and leave the column clear and prominent on the dark absorbing background.

In the drawings, the letter A represents the glass tube of the instrument. B is its mercury-column, and C the dark light-absorbing shield or body, which is placed behind the mercury-column and embodied in the glass. This dark shield may be made of glass which has a dark pigment embodied in it, preferably a black or dark-brown pigment. It will be observed that since the dark shield C cannot affect the color of the mercury-column, though it renders all the rest of the tubing dark, the mercury-column will appear as a white streak on the dark background, and its position can therefore at all times be readily ascertained, even if the room is kept dark.

The scale of the thermometer is engraved on the glass in the usual manner, but is, by preference, tinted white, so that it also will be readily seen in a dark room.

I do not claim in a thermometer a reflecting-shield embodied with the glass and placed behind the mercury-column, as such I know is old; but I do claim—

A thermometer having embodied in the glass thereof a dark light-absorbing shield, C, which is placed behind the mercury-column, substantially as and for the purpose herein shown and described.

HENRY WEINHAGEN.

Witnesses:
GUSTAV SCHNEPPÉ,
JOHN M. SPEER.